United States Patent [19]
van der Lely

[11] 4,105,085
[45] Aug. 8, 1978

[54] TRACTORS AND OTHER VEHICLES

[76] Inventor: Cornelis van der Lely, 7, Brüschenrain, Zug, Switzerland

[21] Appl. No.: 745,204

[22] Filed: Nov. 26, 1976

Related U.S. Application Data

[63] Continuation of Ser. No. 517,068, Oct. 22, 1974, abandoned.

[30] Foreign Application Priority Data

Oct. 22, 1973 [NL] Netherlands ............. 7314474

[51] Int. Cl.² ............. B60J 17/30; B60J 17/34
[52] U.S. Cl. ............. 180/43 R; 180/1 F; 180/44 F; 180/66 R; 180/66 F; 180/89.12
[58] Field of Search ............. 180/44 R, 44 F, 45, 180/46, 50, 51, 52, 66 F, 66 R, 89 R, 65 F, 1 F; 280/93, 95 R, 80 R, 80 A, 43 R, 42

[56] References Cited
U.S. PATENT DOCUMENTS

| 633,763 | 9/1899 | Krieger | 180/65 F |
|---|---|---|---|
| 669,557 | 3/1901 | Stevens | 180/65 F |
| 1,313,937 | 8/1919 | Brinton | 180/65 F |
| 2,674,463 | 4/1954 | Peterson | 280/80 R |
| 2,890,892 | 6/1959 | Strehlow | 280/80 A |
| 2,892,506 | 6/1959 | Slater | 180/65 F |
| 3,067,831 | 2/1962 | Willock | 180/66 F |
| 3,255,840 | 6/1966 | Tangen | 180/45 |
| 3,380,546 | 4/1968 | Rabjohn | 180/65 F |
| 3,404,747 | 10/1968 | Fagel | 180/65 F |
| 3,771,719 | 4/1971 | Raso | 180/65 F |
| 3,805,908 | 4/1974 | Thompson | 180/89 R |

Primary Examiner—Kenneth H. Betts
Attorney, Agent, or Firm—Mason, Mason and Albright

[57] ABSTRACT

A vehicle with a hydraulic system including an engine with a hydraulic pump with at least one driven wheel which incorporates a separate driving mechanism having a hydraulic motor in communication with the hydraulic pump. This motor includes a housing with pistons which are cycled by hydraulic pressure applied through a switching arrangement which periodically opens pressure and return ducts as the wheel turns. A cam plate associated with the wheel shaft allows sensing rollers to move control elements of the duct control members as the wheel turns. The wheel shaft is connected to a crank arm and the pistons' lower rods are drivingly connected to the arm to turn same. Upper rods of the pistons are reciprocated in a tube in a conical housing which extends above the motor housing. The motor housing has an elongated upwardly extending pivot pin slideably held in a divided sleeve assembly, the lower portion of the sleeve assembly being affixed to the housing and the further portion of the sleeve assembly which is connected to the frame of the vehicle being caused by the weight of the frame to abut and adjoin the lower portion as supporting interfaces. The pivot pin received in the sleeve portions is non-rotatably received in the lower portion but movable in an axial direction so that upon the relative raising of the frame the pin is pulled from the lower portion whereby the frame is separated from the housing. The upper part of the pin extending out of the further portion of the sleeve assembly is connected to the steering mechanism of the vehicle.

20 Claims, 8 Drawing Figures

TRACTORS AND OTHER VEHICLES

RELATED APPLICATIONS

This application is a continuation of application Ser. No. 517,068 filed Oct. 22, 1974, now abandoned.

SUMMARY OF THE INVENTION

This invention relates to vehicles such, for example, as tractors, such vehicles being of the kind comprising at least one hydraulically drivable wheel at the side of the or each of which there is a housing for at least one hydraulic mechanism.

According to the invention, there is provided a vehicle of the kind set forth, wherein the housing comprises a pivotal shaft for steering the hydraulically drivable wheel.

BRIEF DESCRIPTION OF THE DRAWINGS

For a better understanding of the invention, and to show how the same may be carried into effect, reference will now be made, by way of example, to the accompanying drawings, in which.

DESCRIPTION OF THE PREFERRED EMBODIMENT

Figure 1:
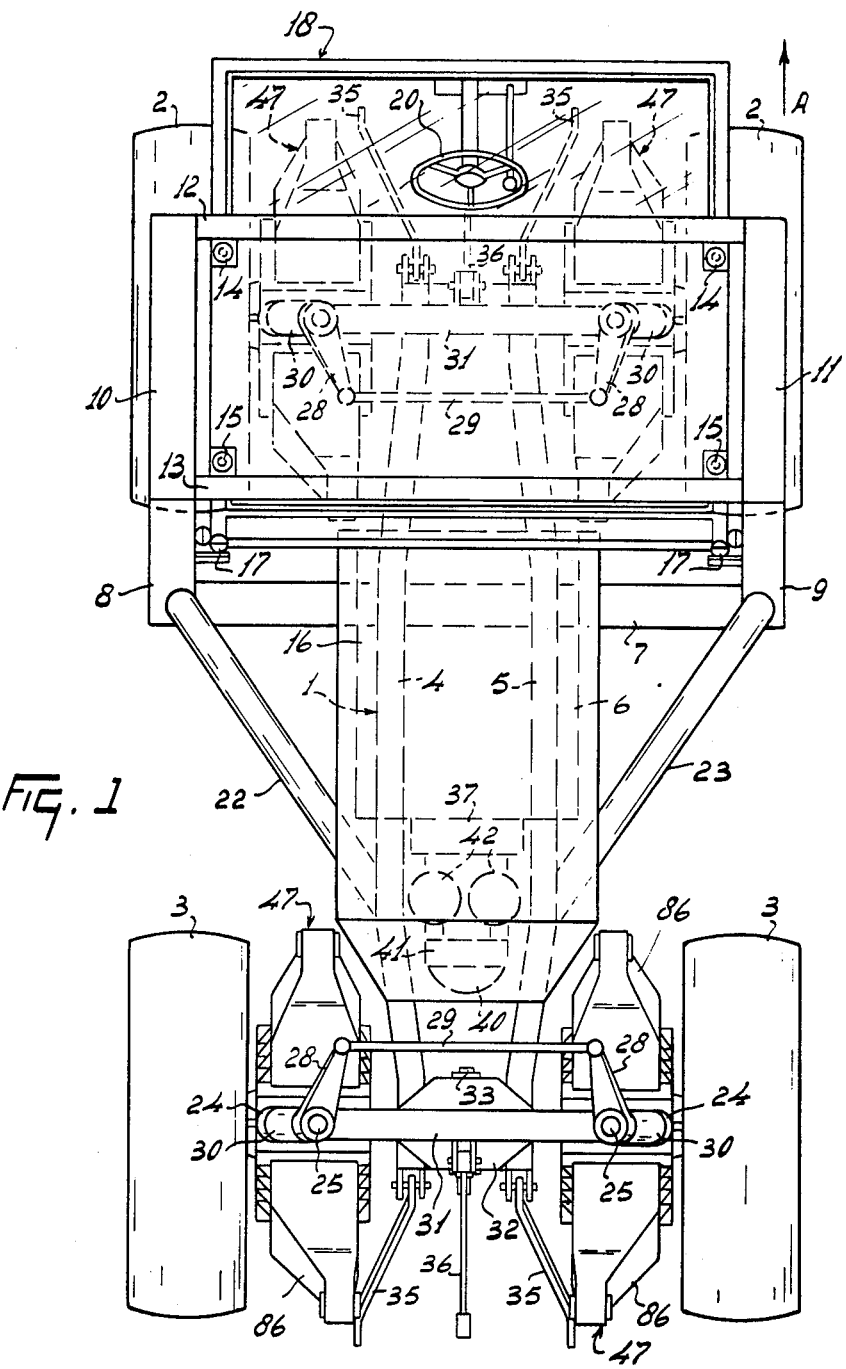
FIG. 1 is a plan view of a tractor in accordance with the invention.

Referring to the drawings, the vehicle which is illustrated has one example of various vehicles to which the invention can advantageously be applied is an agricultural tractor having a frame 1 which is supported on the ground by two drivable and steerable front wheels 2 and by two drivable and steerable rear wheels 3. The frame 1 includes two hollow beams 4 and 5 that extend substantially horizontally parallel to the direction of straight, forward travel of the tractor (which is indicated by an arrow A in FIGS. 1, 2 and 4 of the drawings), said beams 4 and 5 being located alongside one another at least between front and rear axles of the tractor. The beams 4 and 5 support from beneath an internal combustion engine 6 which preferably, but not essentially, is a diesel engine and which also preferably, but not essentially, is rates at substantially 300 horsepower. As will be evident from FIGS. 1 and 2 of the drawings, the engine 6 is located between the front wheels 2 and the rear wheels 3 with respect to the direction A.

Figure 2:
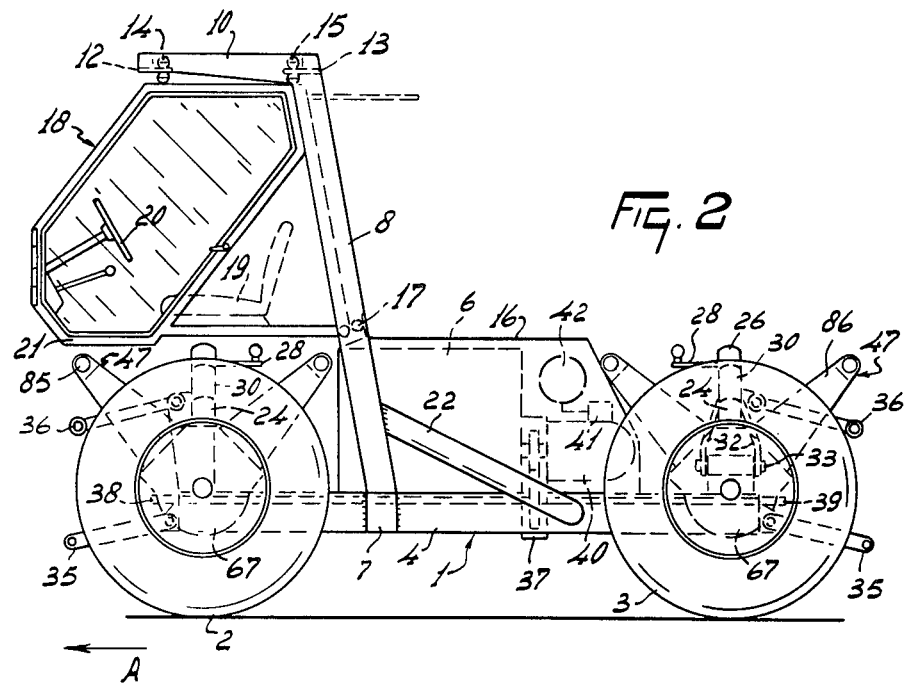
FIG. 2 is a side elevation of the tractor of FIG. 1.

A transverse frame beam 7 is secured to the beams 4 and 5 immediately to the rear of the ground wheels 2 with respect to the direction A and extends substantially horizontally perpendicular to that direction. The beam 7 extends laterally beyond the two beams 4 and 5, which it rigidly interconnects, at both lateral sides of the tractor over distances which are each substantially equal to the spacing between the two beams 4 and 5 in the region of the transverse beam 7. The transverse length of the beam 7 is, in fact, substantially equal to the width of the path of travel or gauge of the tractor (see FIG. 1). As seen in side elevation (FIG. 2), the bottoms of the beams 4, 5 and 7 are located at the same horizontal level. The opposite ends of the beam 7 are welded or otherwise rigidly secured to the lowermost ends of two upright supporting beams 8 and 9 of the frame 1 which beams are inclined forwardly with respect to the direction A at a few degrees to the vertical as seen in side elevation (FIG. 2). Each of the two beams 8 and 9 has a length the magnitude of which is equal to between substantially 80% and substantially 100% of the distance in the direction A between the axes of rotation of the front wheels 2 and the rear wheels 3 when those wheels are disposed for straight travel of the tractor. Extension beams 10 and 11 have their rearmost ends rigidly secured to the upper ends of the two upright beams 8 and 9 and project substantially horizontally forwards therefrom with respect to the direction A. Each of the two extension beams 10 and 11 that has just been mentioned has a length the magnitude of which is equal to substantially one-third of the distance between the axes of rotation of the front wheels 2 and the rear wheels 3 under the circumstances just discussed. The leading ends of the two extension beams 10 and 11 are perpendicularly interconnected by a tie beam 12 of hollow formation and rectangular cross-section and the rearmost ends thereof with respect to the direction A are similarly interconnected by a further hollow tie beam 13 of rectangular cross-section that is substantially horizontally parallel to the tie beam 12 and perpendicular to the direction A. As seen in plan view (FIG. 1), the four beams 10, 11, 12 and 13 define an oblong figure with short sides (10/11) parallel to the direction A and long sides (12/13) perpendicular to that direction. The two leading inner corners with respect to the direction A of the oblong figure that has just been mentioned are provided with two corresponding fastening members 14 and the two rear corners are provided with two similar fastening members 15. The fastening members 14 and 15 are of flexible construction and can move in substantially all directions with respect to the extension arms 10 and 11. They may, for example, be afforded by ball and socket joints suspended in rubber or other resilient bearings.

Figure 3:
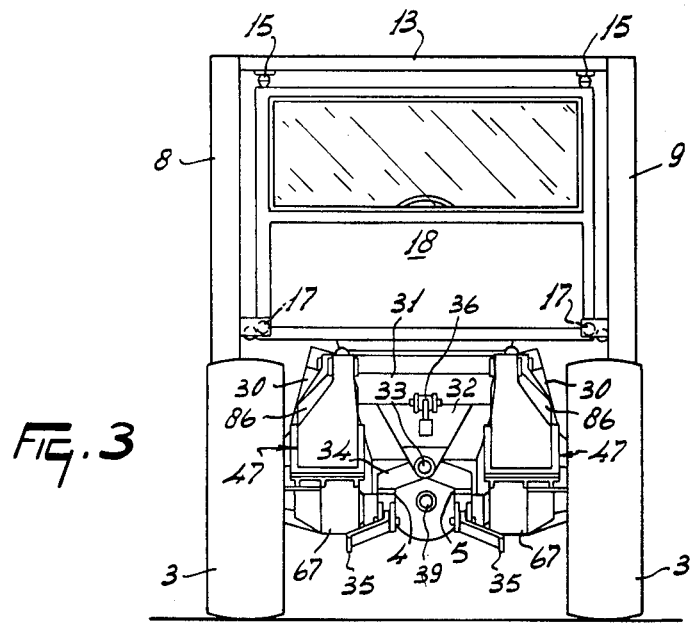
FIG. 3 is a rear elevation of the tractor of FIGS. 1 and 2.

Two further flexible fastening members 17 are provided approximately midway between the lower and upper ends of the two beams 8 and 9 at substantially the same horizontal level as that of a horizontal hood or bonnet 16 that is arranged above the engine 6, the fastening members 17 being of similar construction to the previously mentioned members 14 and 15 and thus being movable in substantially all directions relative to the beams 8 and 9 by which they are carried. A driving cabin 18 is connected to the beams 10 and 11 by the fastening members 14 and 15 and to the beams 8 and 9 by the fastening members 17, the cabin 18 and the parts which it contains thus being connected to the frame 1 of the tractor in a very flexible manner, principally by suspension. The fastening members 14 and 15 flexibly oppose vertical forces exerted on the cabin 18 while the fastening members 17 partially oppose the horizontal forces that are exerted thereon. The cabin 18, contains a driving seat 19 and a steering wheel 20 and other appropriately positioned control members for governing the travel and operation of the tractor. The driving cabin 18 has a bottom or floor 21 which is located at substantially the same horizontal level as the hood or bonnet 16 of the engine 6 and thus at a level above that reached by the uppermost points of the ground-engaging surfaces of the wheels 2 and 3. The two upright supporting beams 8 and 9 are connected, at the rear sides thereof with respect to the direction A, to the leading ends of two downwardly and rearwardly inclined tubular beams 22 and 23 the rearmost ends of which with respect to the direction A are rigidly fastened to the other sides of the hollow frames beams 4 and 5 respectively. The arrangement of the frame 1 and cabin 18 is such that, as seen in side elevation (FIG. 2), the driving seat 19 is located substantially centrally (see FIG. 3) above the two front ground wheels 2.

Figure 5:
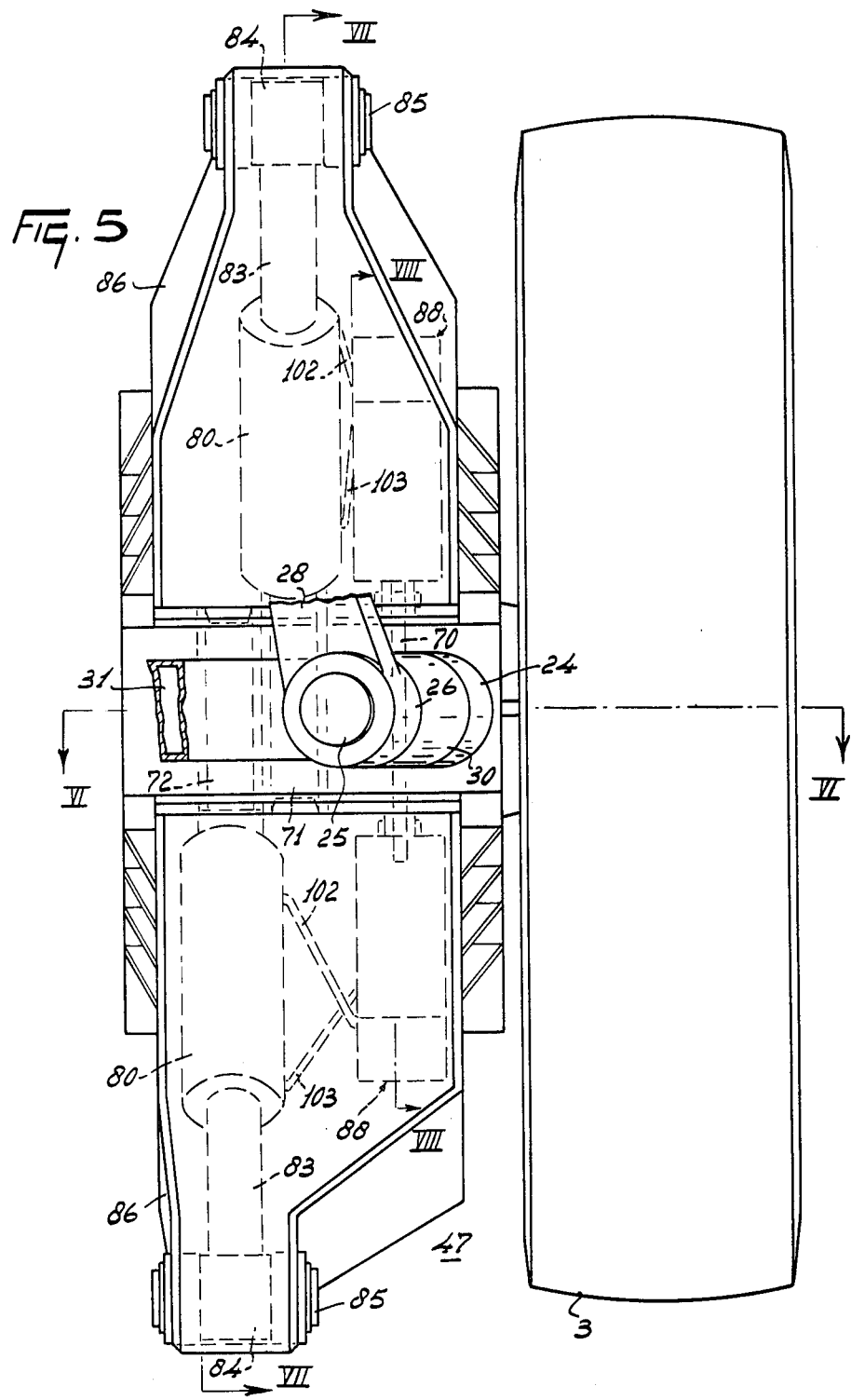
FIG. 5 is a plan view, to an enlarged scale, illustrating further details of the transmission mechanism to one of the rear driving wheels of the tractor.
Figure 6:
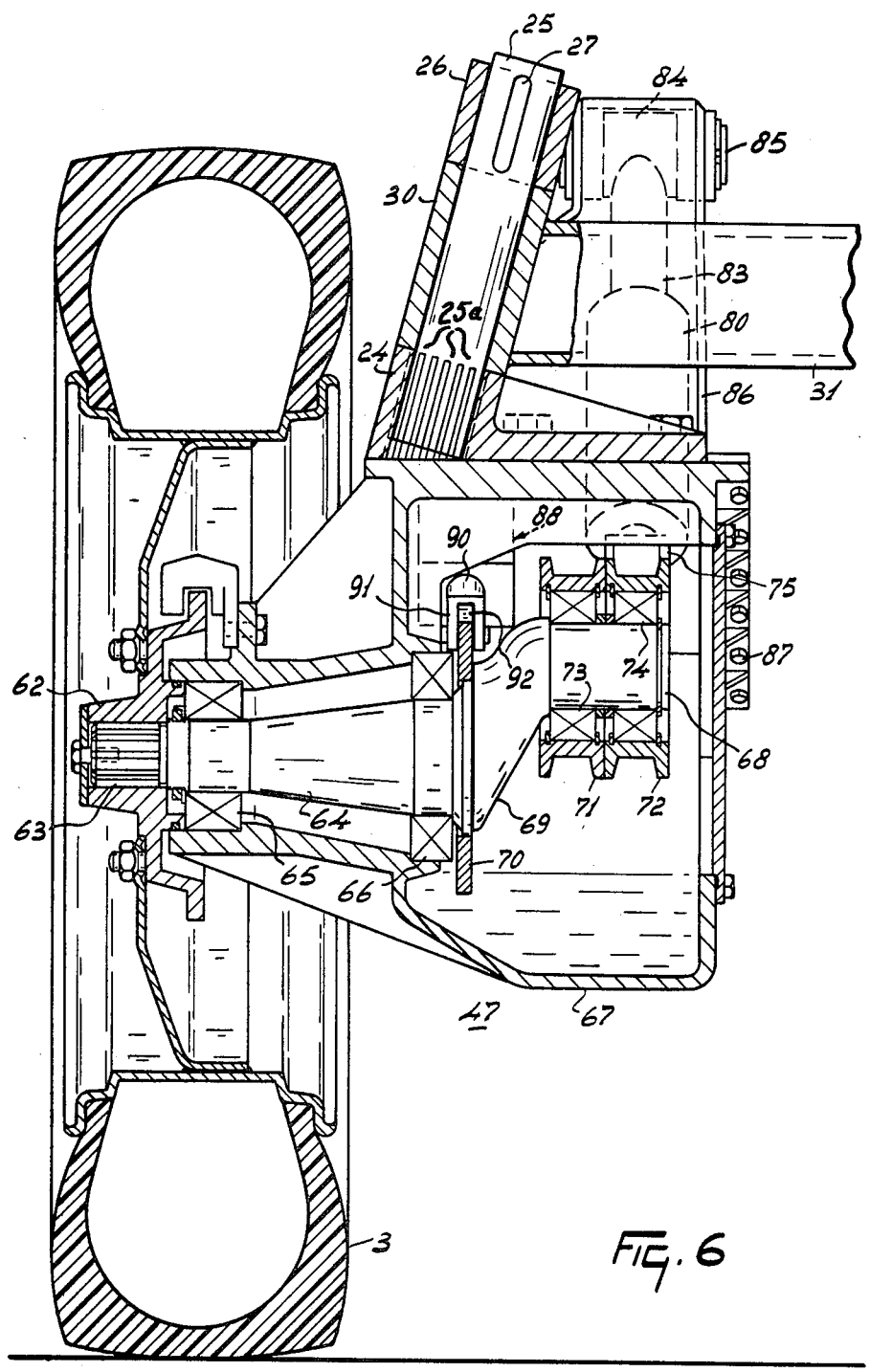
FIG. 6 is a section taken on the line VI—VI in FIG. 5.

The suspensions interconnecting the front ground wheels 2 and the frame 1 on one hand and the rear ground wheels 3 and the frame 1 on the other hand are substantially identical and, accordingly, it is only necessary to describe the suspension interconnecting the rear ground wheels 3 and the frame 1 in greater detail. A drive transmission to the rear wheels 3 will be described in greater detail below and that drive transmission, together with a mounting of the corresponding wheel 3, is secured to a sleeve 24 (FIGS. 5 and 6) that surrounds a corresponding king pin or steering pivot pin 25. The longitudinal axes of the two pins 25 are inclined upwardly towards one another in convergent relationship and are contained in a substantially vertical plane that is substantially perpendicular to the direction A. Each of the axes that has just been mentioned is inclined to the horizontal at an angle of between substantially 70° and substantially 80°. Splines indicated FIG. 6 by reference numerals 25a are provided between each sleeve 24 and the corresponding king pin or pivot steering pin 25 in such a way as to render those parts non-turnable relative to one another. The splines (not shown) are, however, so arranged that said parts are movable relative to one another in an axial direction so that each wheel 3 and a corresponding housing 67 that affords the mounting mentioned above can readily be released and replaced by an alternative unit when required. This operation can be easily accomplished because the weight of the tractor frame 1 and the parts which it carries can be employed to establish a firm connection between the pin 25 and such alternative unit. The upper end of each pin 25 is surrounded by a further sleeve 26, a key connection 27 being provided therebetween to prevent the pin 25 and further sleeve 26 from turning relative to one another. Steering arms 28 (FIG. 1) project generally forwardly with respect to the direction A from the further sleeves 26, with which they are rigid, and the leading ends of the two steering arms 28 are pivotally interconnected by a track rod 29 in a manner which may be substantially conventional and which comprises the use of ball and socket joints at each end of the track rod 29 and means (not illustrated) for minor adjustments of the length of the track rod. The track rod 29 extends substantially horizontally perpendicular to the direction A. One of the two steering arms 28 is also connected in a manner that is not illustrated in the drawings to the steering wheel 20 that is provided in the driving cabin 18.

Considered lengthwise of each king pin or pivot steering pin 25, a corresponding sleeve 30 surrounds that pin between the corresponding lower sleeve 24 and further and upper sleeve 26, the pins 25 being turnable in the sleeves 30. As will be evident from FIG. 6 of the drawings, the supporting opposition of each wheel 3 to gravity acting upon the frame 1 and other parts of the tractor is exerted at the upper end of the sleeve 24 which prevents downward movement of the sleeve 30 along the pin 25. The two sleeves 30 are welded or otherwise rigidly secured to the opposite ends of a hollow transverse axle beam 31 that is substantially horizontally perpendicular to the direction A, the parts at the opposite ends of the axle beam 31 being substantially symmetrically identical to one another with respect to a vertical plane extending in the direction A and containing the midpoint of the beam 31. The top surface of the beam 31 is located at a horizontal level which is, in fact, a little below that of the tops of the wheels 3 but which can be considered as being at approximately the same level as those tops. Two substantially triangular supports 32 depend from the axle beam 31 in spaced apart relationship with respect to the direction A, each support 32 being of isosceles triangular configuration with its uppermost base welded or otherwise rigidly secured to the bottom of the axle beam 31. The lowermost apices of the two supports 32 are located in the aforementioned substantially vertical plane that extends in the direction A and that contains the midpoint of the beam 31, said plane being a plane of approximate symmetry of the tractor. The two apices are located at substantially the same distance above the ground as is the common axis (when the ground wheels 3 are disposed for straight travel of the tractor) of rotation of the two ground wheels 3. The apex regions of the two supports 32 support a pivotal shaft 33 that extends substantially horizontally parallel to the direction A, a bridge 34 (FIG. 3) being turnable about the shaft 33 between the two supports 32. The bridge 34 extends transverse to the direction A and its opposite sides are substantially symmetrical relative to the plane discussed above which plane, of course, contains the longitudinal axis of the pivotal shaft 33. Lower surfaces of the opposite ends of the bridge 34 are welded or otherwise rigidly secured to the tops of the two hollow frame beams 4 and 5 which beams are more closely adjacent to one another in their leading and rear end regions than they are in a larger intermediate region thereof (see FIG. 1). Rubber bushings or other resilient rings may be arranged between the pivotal shaft 33 and the bridge 34 in such a way as resiliently to connect the two supports 32 to the bridge 34. The remainder of the tractor is thus essentially resiliently connected by the rear bridge 34 (and the corresponding front bridge 34) to the supports 32 and is turnable, against resilient opposition, about the axis of the shaft 33 relative thereto. The rear of the tractor is provided with a three-point lifting device or hitch comprising two lower and horizontally spaced apart lifting links 35 and a single upper lifting link 36 that may be of adjustable length. The front of the tractor with respect to the direction A is also provided with a similar three-point lifting device or hitch, comprising parts 35 and 36, both lifting devices or hitches being operable hydraulically by the hydraulic system of the tractor in a manner which is known per se.

A gear box 37 is disposed behind the engine 6 with respect to the direction A and contains transmission parts which are arranged to be driven from that engine. The gear box 37 has output shafts from which a front power take-off shaft 38 and a rear power take-off shaft 39 can be driven, said power take-off shafts being capable of operating the moving parts of tools, implements or machines that may be connected to the front and rear three-point lifting devices or hitches of the tractor. Shafts that interconnect the output shafts of the gear box 37 and the power take-off shafts 38 and 39 extend substantially horizontally parallel to the direction A as can be seen in broken lines in FIG. 2 of the drawings, one of those shafts extending beneath the engine 6. The gear box 37 preferably comprises controls by which the transmission ratio between the engine 6 and each power take-off shaft 38 and 39 can be adjusted to any chosen one of a plurality of different values. With the preferred engine rating of substantially 300 horsepower, approximately 100 horsepower is available for the operation of the power takeoff shafts 38 and 39 so that approximately 200 horsepower remains for traction and other purposes. A pump 40 for the oil or other fluid pressure medium of the hydraulic system of the tractor is arranged behind the engine 6 and is preferably driven from the gear box 37 so that the variable transmission ratio of that gear box can be utilized. A valve of regulating block 41 and two hydro-pneumatic or other accumulators 42 having construction, which are known per se are provided on top of the housing of the pump 40.

Figure 4:
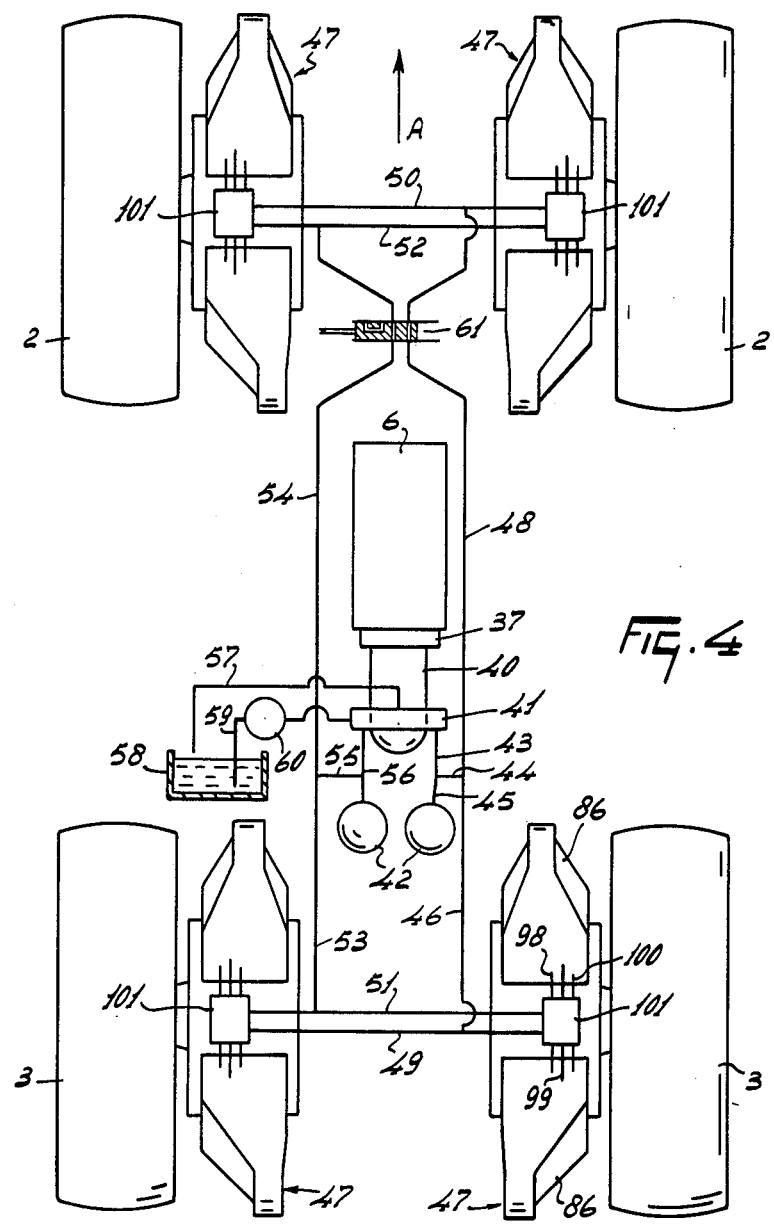
FIG. 4 is a schematic plan view of the mechanical and hydraulic driving system of the tractor of FIGS. 1 to 3.

FIG. 4 of the drawings schematically illustrates the operation of the tractor which is being described. The pump 40 is driven by the engine 6, preferably but not essentially through the intermediary of the gear box 37, and delivers oil or other hydraulic medium under pressure into interconnected ducts 43 and 44. This oil under pressure is destined for the operation of the front and rear wheels 2 and 3. A branch duct 45 extends between the junction of the ducts 43 and 44 and one of the two accumulators 42 that has been mentioned above. The duct 44 divides into a duct 46 leading to driving mechanisms 47 (that will be described in greater detail below) of the two rear wheels 3 and a duct 48 that similarly supplies driving mechanism 47 of the two front wheels 2. To this end, the duct 46 supplies a transverse duct 49 for the two rear mechanisms 47 and the duct 48 similarly supplies a transverse duct 50 that is in communication with the two front driving mechanisms 47. The return of the oil from the four driving mechanisms 47 is accomplished by a rear transverse return duct 51 and a front transverse return duct 52, these ducts joining rear and front return ducts 53 and 54 respectively which ducts converge into collection ducts 55 and 56 that lead to the pump 40 and/or to an oil or other fluid pressure medium reservoir 58 by way of the valve or regulating block 41 and a further return duct 57. A supply duct 59 opens beneath the liquid level in the reservoir 58 and leads to the inlet of the pump 40 by way of the valve or regulating block 41 and an auxiliary pump 60 that positively supplies the oil to the inlet side of the main pump 40.

The supply and return ducts 48 and 54 for the driving mechanisms 47 of the two front ground wheels 2 pass through a common control valve 61 whose position can be governed from the control console in the driving cabin 18. As will be evident from FIG. 4 of the drawings, the valve 61 has two effective positions. In the first position that is the operative one illustrated in FIG. 4, the ducts 48 and 54 are in direct open communication with the corresponding transverse ducts 50 and 52. In the second possible position of the valve 61, the two ducts 48 and 54 are both closed and become ineffective while the two transverse ducts 50 and 52 are placed in direct open communication with one another. The first position of the valve 61 is employed when the tractor is travelling at a slow speed and has to exert a high ractive effort (i.e. four wheel drive) whereas the second valve position is employed when the tractor has reached a desired travelling speed or does not need to exert a high tractive effort. It will be apparent that, in this second position, the front wheels 2 are not driven, because the corresponding mechanisms 47 are not supplied with oil or other fluid pressure medium, and the whole of the output of the pump 40 is available to power the driving mechanisms 47 of the two rear wheels 3 thus allowing those wheels 3 to be rotated at a higher speed than is possible when the pump 40 has to supply all four of the mchanisms 47. It should be noted that, when the valve 61 is in the second of the two positions which have just been discussed, the ground wheels 2 naturally continue to rotate by viture of their contact with the ground surface and this rotation causes their driving mechanisms 47 to displace oil.

This oil merely circulates between the two front driving mechanisms 47 and does not perform any other function. The valve or regulating block 41 is provided with at least one control by which the speed of travel of the tractor over the ground and other variables thereof can be governed.

FIGS. 5, 6, 7 and 8 of the drawings illustrate details of the construction and arrangement of one of the driving mechanism 47 of one of the rear wheels 3. The mechanisms 47 associated with the other three wheels 2 and 3 are substantially identical and do not need separate descriptions. Each driving mechanism 47 is effectively integral with a hub 62 of the corresponding wheel 2 or 3 although that wheel itself, with its pneumatic tire, can be removed from the hub 62 in a substantially conventional manner which utilizes the studs and cooperating nuts that are visible in FIG. 6 of the drawings. The driving mechanism 47 that is illustrated in FIG. 5 to 8 of the drawings and that is to be described is bodily turnable, with the corresponding wheel 3, about the axis of the corresponding king pin or pivot steering pin 25. The wheel hub 62 is connected by axially parallel splines 63 to the outer end of a shaft 64 so that the hub 62 will be non-rotatable relative to the shaft 64 but axially removable therefrom when required. The longitudinal axis of the rotary shaft 64 is, of course, perpendicular to the plane of rotation of the wheel 3, said shaft 64 constituting an axle of the wheel 3. The axle shaft 64 is rotatably journalled in an outer ball bearing 65 and in an inner ball bearing 66 that is axially spaced from the bearing 65. A crank pin 68 is eccentrically connected to the axle shaft 64, inwardly beyond the bearing 66, by a crank arm or check 69, it being greatly preferred that the axle shaft 64, the crank arm or cheek 69 and the crank pin 68 should be forged integrally from a single piece of steel. The axis of the crank pin 68 is parallel to that of the axle shaft 64 and is perpendicularly spaced therefrom by a distance which is equal to substantially 16% of the radius of the whole wheel 3. A cam plate 70 completely surrounds the crank arm or cheek 69 immediately alongside the inner ball bearing 66, its general plane being perpendicular to the axis of the axle shaft 64. A central region of the cam plate 70 is rigidly secured to a circular milled portion of the crank arm or cheek 69, the center point of that portion being coincident with the axis of the axle shaft 64. The length of the crank arm or cheek 69 when measured in a directior parallel to the axes of the axle shaft 64 and crank pin 68 is substantially the same as the axial length of the crank pin 68 itself.

The crank pin 68 is surrounded by two bearing bushing 71 and 72 that are in axially abutting side-by-side relationship, the two bushings 71 and 72 being rotatable around the pin 68 with the air of ball bearings 73 and 74 respectively. The arrangement is such that the two bushings 71 and 72 are freely rotatable independently of each other. A socket 75 is integral with the bushing 72, projects substantially radially therefrom and is formed with a radial (with respect to the axis of the pin 68) bore in which one end of a piston rod 76 is rigidly secured (see FIG. 7). A socket 77 is similarly integral with the bushing 71 and has a radial bore in which one end of a further piston rod 78 is rigidly secured. The two piston rods 76 and 78 are of equal lengths, these lengths being substantially the same as the over-all radius of the wheel 3. Apart from the fact that the two piston rods 76 and 78 occupy different angular dispositions relative to the axis of the crank pin 68 and are axially spaced apart from one another by a short distance along the latter, they, and their associated parts, are identical in construction so that it is only necessary to described the piston rod 78 and its associated parts in further detail.

Figure 7:
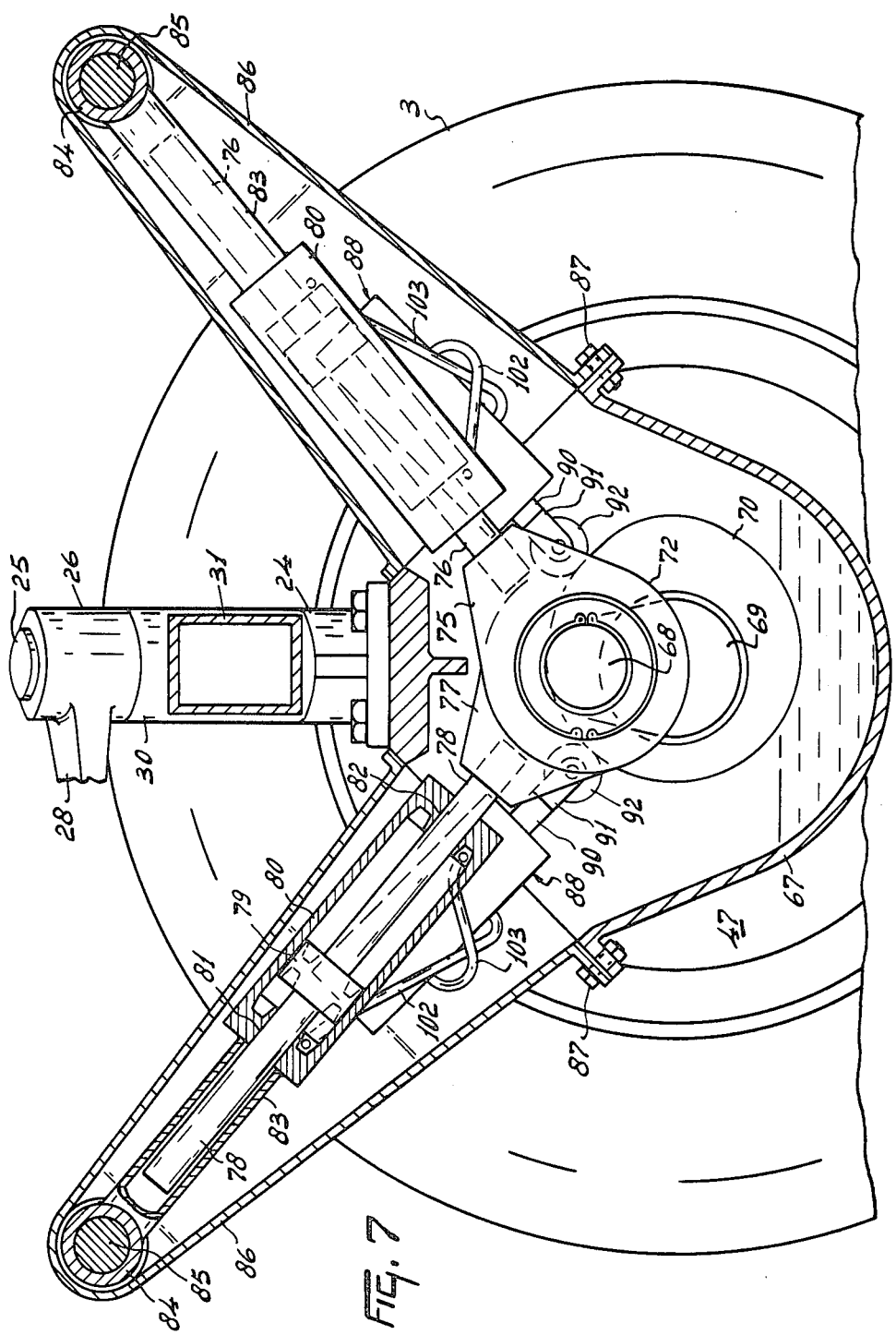
FIG. 7 is a section taken on the line VII—VII in FIG. 5.

A piston 79 is rigidly secured to the piston rod 78 substantially midway along the length of the latter, the longitudinal axis of the piston 79 being coincident with that of the rod 78. The piston 79 and part of the length of the rod 78 are received within a cylinder 80 and are axially displaceable relative to that cylinder. The opposite end walls of the cylinder 80 are formed with bores 81 and 82 through which regions of the piston rod 78, at opposite sides of the cylinder 79, are slidably entered. The end of the cylinder 80 that is remote from the crank pin 68, and in which the bore 81 is formed, is connected to one end of a hollow cylindrical fastening tube 83 that coaxially surrounds part of the piston rod 78. The tube 83 extends beyond the end of the piston rod 78 that is remote from the crank pin 68 and is there provided with a bearing eye 84 that is turnable around a pivot pin 85. The axis of the pivot pin 85 is parallel to those of the axle shaft 64 and crank pin 68 and the opposite ends of said pin 85 that project from the opposite axial ends of the eye 84 are secured in the walls of a substantially conical housing 86, near the rounded apex end of the latter, the base end of said housing 86 being rigidly but releasably secured to the aforementioned housing 67 by bolts 87. As seen in FIG. 7 of the drawings, the rounded apex end of the housing 86 embraces the pivot 85 and the bearing eye 84 through substantially 180°, the walls of the housing 86 being divergent from the apex and thereof towards the base end that is secured to the housing 67. Again as seen in FIG. 7 of the drawings, the angle of divergence between the walls of the housing 86 towards the housing 67 is substantially 16°. This arrangement enables the cylinder 80 to rock to and fro to some extent about the pivot pin 85 to which it is turnably connected by the rigid fastening tube 83 and bearing eye 84. The housing 86 that encloses the cylinder 80 corresponding to the piston rod 76 is slightly different in shape to the housing 86 that has just been described because of the axially spaced apart relationship of the two piston rods 76 and 78 relative to the crank pin 68. The difference in shape of the two housings 76 is only slight as seen in FIG. 7 of the drawings but a more marked difference in shape is apparent in FIG. 5 thereof. As viewed in FIG. 7 of the drawings, a line interconnecting the axis of the pivot pin 85 that corresponds to the piston rod 78 and the longitudinal axis of the shaft 64 is inclined at an angle of substantially 90° to a line interconnecting the longitudinal axes of the shaft 64 and the crank pin 68.

Figure 8:
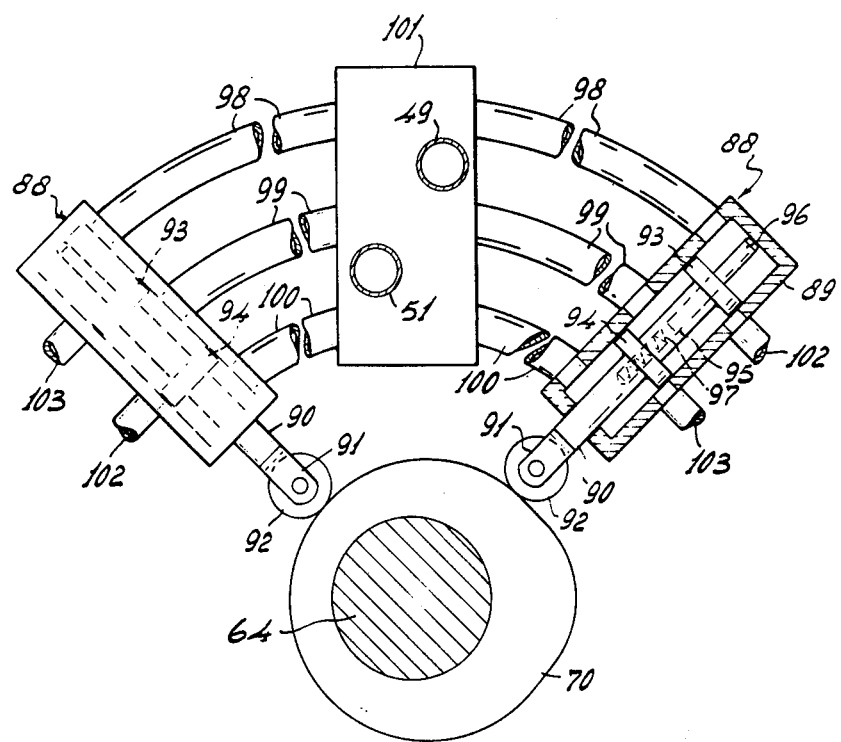
FIG. 8 is a diagrammatic part-sectional elevation of a control system for the drive transmission to one of the tractor wheels.

A control member 88 is rigidly secured to the wall of the housing 86 and/or to the wall of the housing 67 close to each of the cylinders 80. There are thus two of the control members 88 that correspond to the two housings 86 for each wheel 2 and 3. The control members 88 are of cylindrical configuration and are arranged with their longitudinal axes radially disposed with respect to the axis of the axle shaft 64. FIG. 8 of the drawings illustrates, diagrammatically, the arrangement of the pair of control members 88 that corresponds to the ground wheel 3 under discussion. Each control member 88 has a cylindrical housing 89 which is formed, at the end thereof that is closest to the axle shaft 64 and crank pin 68, with an opening through which an axial piston rod 90 is entered. The end of the piston rod 90 that projects from the cylindrical housing 89 carries a fork 91 between the limbs of which a sensing roller or cam follower 92 is mounted so as to be rotatable about an axis that is parallel to the axes of the axle shaft 64 and crank pin 68. The position of each control member 88 is such that the corresponding sensing roller 92 will cooperate with the outer edge of the cam plate 70, the longitudinal axis of the housing 89 of each control member 88 being contained in a corresponding plane that is perpendicular to the axes of the shaft 64 and the crank pin 68. The end of each piston rod 90 that is located internally of the corresponding housing 89 and that is remote from the roller 92 concerned, is provided with a piston 93 and a second piston 94 is also secured to the rod 90 substantially midway between the piston 93 and the base of the corresponding fork 91. The end of each piston rod 90 that is remote from the corresponding roller 92 is formed with an axial bore 95 in which a pin 96 is telescopically slidable. A helical compression spring 97 bears between the inner end of the bore 95 and the end of the pin 96 that is located in that bore, the spring 97 tending to urge the pin 96 axially out of the bore 95 so that its free end will bear against the inner surface of the closed end of the housing 89 with the result that the roller 92 connected to the corresponding piston rod 90 will tend to be retained in contacting engagement with the outer edge of the cam plate 70. Three openings are formed in the wall of each cylindrical housing 89 at regular distances from one another considered axially of the housing and three ducts 98, 99 and 100 are in communication with the corresponding openings. The ends of the ducts 98 to 100 that are remote from the housing 89 open into a collecting block 101. The curved wall of the cylindrical housing 89 has two further openings that are spaced apart from one another axially of the housing and that are located between pairs of the three openings that have already been mentioned when considered in the same axial direction. The two openings that have just been mentioned are in communication with corresponding ducts 102 and 103 and the opposite ends of said ducts 102 and 103 open into the corresponding cylinder 80 at opposite ends thereof and thus at opposite sides of the corresponding piston 79 (see FIG. 7, in particular, of the drawings). Grooves are formed in the walls at the ends of the chamber of the cylinder 80 and the ducts 102 and 103 open into these grooves so that they shall never be closed by the piston 79. The opposite working faces of the piston 79 are also formed with complementary grooves. The ducts 102 and 103 are of flexible construction and it should be noted that, if the block 101 is arranged on the non-steerable axle beam 31, then the ducts 98, 99 and 100 also need to be of flexible construction. It will be seen from FIG. 8 of the drawings that ducts 98, 99 and 100 corresponding to each of the two control members 88 are connected to the illustrated colleting block 101 and that, in respect of the wheel 3 that is under consideration, the colleting block 101 in question is also in communication with the transverse supply duct 49 and the transverse return duct 51 (FIG. 4). The bottom of the housing 67 contains a quantity of lubricating oil to a depth which is sufficient to ensure that, during operation, various parts repeatedly dip into that oil so that the bearings 73 and 74 and other moving parts are either dip-lubricated or splash-lubricated.

In the operation of the driving mechanism 47 that has been described, the pump 40 is energized by the engine 6 and oil or other medium flows to that mechanism 47 by way of the valve or regulating block 41, the ducts 43, 44, 46 and 49 and one of the inlet openings of the corresponding collecting block 101. The oil passes from the collecting block 101 into the ducts 99 so that the region of the interior of each housing 89 that lies between the corresponding pistons 93 and 94 is subject to pressure. When the piston rods 90 are in the positions illustrated in FIG. 8 of the drawings, the oil that reaches the regions of the two housings 89 that have just been mentioned from the ducts 99 can escape by way of the open ducts 102 but not by way of the ducts 103 that are blocked by the second pistons 94. The oil that enters the ducts 102 from the housings 89 of the control members 88 passes to the end of the chamber of the cylinder 80 associated with the piston rod 78 that is remote from the crank pin 68 and to the end of the chamber of the cylinder 80 associated with the piston rod 76 that is closest to the crank pin 68. The result is that, as seen in FIG. 7 of the drawings, both the left-hand and right-hand pistons 79 and the corresponding rods 78 and 76 are moved generally to the right so that the crank pin 68 also tends to turn to the right as seen in FIG. 7 of the drawings about the axis of the shaft 64 with which it is rigid. This naturally rotates the shaft 64 about its own axis and turns the wheel 3 with it. Oil already in the regions of the chambers of the cylinders 80 at the opposite sides of the pistons 79 from the regions connected to the ducts 102 is returned to the control members 88 through the ducts 103 which open into the ends of the chambers of the housings 89 that are closest to the rollers 92 (see FIG. 8). The ducts 100 are also in open communication with the regions of the chambers of the housings 89 that have just been mentioned and the return oil can thus flow back to the inlet side of the pump 40 and/or to the reservoir 58 by way of the corresponding collecting block 101, the transverse return duct 51, the ducts 53, 55 and 56 and the valve or regulating block 41.

The edge of the cam plate 70 has shape which is such that, as viewed lengthwise of the axis of the correponding shaft 64 (FIG. 8), it can cause the piston rods 90 to occupy axial positions in the housings 89 which are such that the connections to the ducts 102 and 103 are reversed as regards their "pressure" and "return" functions. When, as a result of angular displacement about the axis of the corresponding shaft 64, the cam plate 70 has reached this reversing position, both pistons 79 and the corresponding rods 76 and 78 will be urged strongly generally to the left as seen in FIG. 7 of the drawings, rather than to the right as previously. However, it will be realized that, by this time, the crank pin 68 will have turned about the axis of the corresponding shaft 64, as seen in FIG. 7 of the drawings, through such an angle that it will then be below a horizontal plane containing the axis which has just been mentioned so that the moving pistons 79 will urge the crank pin 68 and corresponding shaft 64 to continue to rotate in the same direction as they were already doing. A further reversal of the functions of the ducts 102 and 103 takes place again after the shaft 64 has rotated through substantially the next 180° about its own axis. The shape of the outer edge of the cam plate 70 is dictated principally by the need for the shaft 64 to rotate in a uniform manner which is such that its angular displacement per unit time is substantially constant in respect of any chosen setting of the controls. The required axial input and output speeds of the piston rods 76 and 78 and their pistons 79 relative to the cylinders 80 can be mathematically derived from the rotational requirement of the axle shaft 64 taking into account, of course, the oscillation of the cylinders 80 about the pivot pins 85, that oscillation having an amplitude of substantially 10°. The movements of the pistons 79 relative to the cylinders 80 that are necessary for uniform rotation of the shaft 64 depend, of course, upon corresponding quantities of oil being supplied to, and conducted away from, the opposite sides of the pistons 79 at the necessary volumes per unit time. The quantities of oil that are being moved in this way vary cyclically per unit time during each revolution of the axle shaft 64, the instant in each such revolution cycle that corresponds to the maximum displacement of oil coinciding with the time at which a line interconnecting the axes of the shaft 64 and the pin 68 (as seen in FIG. 7 of the drawings) is substantially perpendicular to the longitudinal axis of the piston rod 78. It will be realized that, in fact, such circumstances will occur twice in every revolution cycle and that the piston 79 corresponding to the rod 78 will be moving in opposite directions in the cylinder 80 at these two instants. The minimum displacement of oil (i.e. zero) occurs at the instants at which, as seen in FIG. 7 of the drawings, the longitudinal axis of the piston rod 78 intersects the longitudinal axis of the shaft 64, the piston and cylinder combination 78/79/80 being at a so-called "dead point" at these instants. It will, however, be realized that the piston and cylinder combination 76/79/80 is 180° "out of phase" with the combination 78/79/80 that has just been mentioned so that the "dead point" of one combination corresponds to the instant of maximum oil displacement of the other combination and vice versa. This relationship depends, however, upon the angular relationship about the crank pin 68 of the two piston and cylinder combinations that correspond to each wheel 2 or 3. The quantity of oil that is supplied to each cylinder 80 per unit time during one revolution cycle of the corresponding axle shaft 64 is controlled by the members 88 which, in fact, produce a feedback. This quantity control or "dosing" is a function of the movements of the piston rods 90 in the housings 89 of the control members 88 and is determined by the configuration of the edge of the cam plate 70 that co-operates with the rollers 92. The shape of the cam plate 70 varies the quantities of oil supplied by causing the pistons 93 and 94 to move and wholly or partly open or close the ducts 102 and 103 at different instants in dependence upon the particular shape of the cam plate. The hydropneumatic or other accumulators 42 are provided in connection with the ducts at the pressure and return sides of the pump 40 to compensate for variations in the over-all quantity of oil supplied to, and/or returned from, the various driving mechanisms 47 at different instants during operation, the accumulators being arranged to receive and/or to return any quantities of oil that may be necessary to match variations from the mean quantity of oil that is normally in operative circulation.

It is, in fact, possible to provide one of the ground wheels 3 with only a single, rather than a dual, driving mechanism 47, that is to say with only a single one of the piston and cylinder combinations that have been described. With such an arrangement, the other one of the two rear wheels 3 is similarly provided with only a single driving mechanism 47 but this mechanism is angularly out of phase with that of the other wheel 3, the angular displacement between the two mechanisms being conveniently substantially 90°. With this arrangement, when one mechanism reaches the "dead point" position that has been described, the other mechanism will substantially be in a position of maximum oil displacement and will thus be capable of imposing a high driving torque which, together with the inertia of the tractor when it is travelling, will ensure that drive will not be involuntarily discontinued. The two rear wheels 3 may be mechanically interconnected by a single axle with the arrangement that has just been described. It is also possible to provide all, or some, of the ground wheels 2 and 3 with multiple driving mechanisms that exhibit more than two of the piston and cylinder combinations per mechanism 47 that have been described above. Such mechanisms may be angularly spaced apart from one another about the axis of the corresponding shaft 64 to give a star-shaped configuration as viewed lengthwise of that axis.

The controls of the valve or regulating block 41 are employed to vary the quantity of oil supplied from the pump 40 per unit time so that the speed of rotation of the wheels 2 and 3 can be uniformly increased or decreased as required. A proportionately higher or lower quantity of oil per unit time is displaced during each cycle of revolution of each axle shaft 64. When the tractor is driven through a bend, the overall quantity of oil supplied to, and returned from, the driving mechanisms 47 of the two rear wheels 3 and the two rear wheels 2 automatically adjusts itself in a correct manner so that the wheels at the radially inner and radially outer sides of the bend are driven at the proper relative speeds. It will be realized that each of the four ground wheels 2 and 3 is rotated by its own individual driving mechanism 47 so that there is no need for central rear and/or front driving mechanisms such as differentials. The supply of energy to the ground wheel is effected solely through oil-carrying ducts. Since no central drive mechanism is required for either the front wheels 2 or the rear wheels 3, a heavy, bulky and somewhat expensive fluid pressure motor and that would otherwise be connected to the pump 40 can be entirely omitted together with a complicated and expensive hydraulic change-speed gear. These parts, together with various driving shafts, differentials, forward and reverse gears, universal joints and the like are all replaced by the hydraulically energizable mechanisms 47 that transform linear reciprocations of the pistons 79 into rotation of the axle shafts 64 in a very simple manner. If, as will be desirable for some vehicles, the wheels 2 and 3 are connected to the frame 1 by a resilient suspension, no flexible mechanical couplings are required for the drive to the rear wheels 3 or to the rear wheels 3 and front wheels 2 because the driving mechanisms 47 are already rigid with the housings 67 that afford mountings for the wheels 2 and 3 and are already connected to the other parts of the hydraulic system of the vehicle by flexible ducts. Particularly when, as has been described above, both the front wheels 2 and the rear wheels 3 of a vehicle in accordance with the invention are steerable wheels, the invention offers a very satisfactory and inexpensive substitute for a rotary hydraulic motor in association with each wheel or a complicated mechanical drive to all four wheels from a central drive unit. As previously mentioned, the wheels 2 and 3 and the associated mechanisms 47 can readily be removed from the tractor, and replaced, as single units. The wheels 2 and 3 alone can be removed from the hubs 62, and replaced thereon, in a substantially conventional manner as will be evident from FIG. 6 of the drawings.

The driving mechanisms 47 for the shafts 64 could, it will be realized, equally well be employed in the moving parts of basically stationary machines and in airborne and waterborne vehicles as well as in land vehicles.

Although various features of the tractor that have been described and/or illustrated in the accompanying drawings will be set forth in the following claims as inventive features, it is emphasized that the invention is not necessarily limited to those features and that it includes within its scope each of the parts of the tractor that has been described and/or illustrated in the accompanying drawings both individually and in various combinations.

What is claimed is:

1. An agricultural tractor type vehicle comprising a frame and wheel structures supporting said frame, at least one of said wheel structures comprising housing means and a wheel rotatably mounted on said housing means, said one wheel structure being connected to said frame by an elongated upwardly extending pivot pin held in a sleeve assembly, a lower portion of said sleeve assembly being fixed to said housing means and a further portion of said sleeve assembly caused by the weight of said frame to abut and adjoin said lower portion at supporting interfaces, said pin being nonrotatably received in the lower portion, said further portion being fastened to said frame, said one wheel structure and lower portion upon the relative raising of said frame only being movable relative to said frame and said pin in a downward direction along the longitudinal axis of said pin and separable from the remainder of the vehicle.

2. A vehicle as claimed in claim 1, wherein said wheel structure includes a driving mechanism within said housing.

3. A vehicle as claimed in claim 2, wherein said driving mechanism comprises a hydraulic motor in communication with a hydraulic system of said vehicle.

4. A vehicle as claimed in claim 1, wherein said wheel structure is pivotable relative to said frame and said pin is rotatable relative to said further portion.

5. A vehicle as claimed in claim 4, wherein said interfaces are rotatable with respect to one another and afford supporting surfaces that support said frame relative to said wheel structure.

6. A vehicle as claimed in claim 5, wherein a beam of said frame is connected to said further portion and an upper portion of said assembly non-rotatably receives said pin, and steering means being fastened to the upper portion.

7. A vehicle as claimed in claim 6, wherein said pin is axially movable relative to said lower portion and said steering means is connected to turn said upper portion and lower portion together with said wheel structure.

8. A vehicle as claimed in claim 7, wherein said pin is fastened to said upper portion by removable key means.

9. A vehicle as claimed in claim 7, wherein said pin extends upwardly at an angle of about 70° - 80° to the horizontal and away from said wheel structure.

10. A vehicle for use as an agricultural tractor comprising:
a frame and a plurality of rotatable wheel structures supporting said frame;
housing means and wheel means mounted thereon included in at least one of said wheel structures;
a hydraulic system mounted on said frame;
a hydraulic motor carried in said housing means adapted to rotate said wheel means;
shaft means received by the upper part of said housing so a to be non-rotatable relative thereto and movable in the direction of its longitudinal axis relative thereto;
a sleeve affixed to said frame, said sleeve receiving said shaft means and bearing on said upper part of said housing whereby the weight of said frame is supported at least in part by said one wheel structure; and
further means provided to interconnect said shaft means and said frame establishing predetermined restrictions on the relative motion between said shaft means and said frame whereby upon solely the relative raising of said frame together with said shaft means over and relative to said housing means, said housing means is separated from said frame and said shaft means by the forces of gravity alone.

11. A vehicle in accordance with claim 10, wherein said further means is affixed to said shaft means so as to be non-rotatable relative thereto.

12. A vehicle in accordance with claim 11 wherein said further means includes steering means for selectively turning said corresponding wheel structure about the longitudinal axis of said shaft means.

13. A vehicle in accordance with claim 11 wherein the longitudinal axis of said shaft means is substantially at an angle of between 70° and 80° relative to the axis of rotation of the corresponding said wheel means.

14. A vehicle in accordance with claim 11, wherein said shaft means is entirely spaced substantially above the axis of rotation of the corresponding said wheel means.

15. A vehicle in accordance with claim 11 wherein said shaft means is affixed to said housing means by a further sleeve affixed to the upper part of said housing.

16. A vehicle in accordance with claim 66 wherein said sleeves are aligned and define a continuous opening for said shaft means.

17. A vehicle for use as an agricultural tractor comprising:
a frame and a plurality of rotatable wheel structures supporting said frame;
housing means and ground engaging wheel means mounted thereon included in at least one of said wheel structures;
a motor adapted to drive said wheel means carried in said housing means;
shaft means held by said frame received by the upper part of said housing so as to be non-rotatable relative to said housing and movable in the directions of its longitudinal axis relative to said housing;
a sleeve in said frame receiving said shaft means, said sleeve bearing in a weight supporting relationship on said upper part of said housing whereby the weight of said frame is supported at least in part by said one wheel structure; and
the longitudinal axis of said shaft means substantially intersecting the center of the place where said wheel means engages the ground.

18. A vehicle in accordance with claim 17 wherein said longitudinal axis defines with a plane perpendicular with the axis of rotation of said wheel means an angle of between 10° and 20°.

19. A vehicle in accordance with claim 18 wherein said shaft means is entirely spaced substantially above the axis of rotation of the corresponding said wheel means.

20. A vehicle in accordance with claim 19 wherein said shaft means is affixed to said housing means by a further sleeve affixed to the upper part of said housing.

* * * * *